United States Patent
Yung

(10) Patent No.: US 7,559,028 B2
(45) Date of Patent: Jul. 7, 2009

(54) METHOD AND APPARATUS FOR USER FUNCTION VARIABLE PROCESSING SYSTEM AND PROMPT

(75) Inventor: David Yung, Concord, CA (US)

(73) Assignee: Oracle International Corporation, Redwood Shores, CA (US)

( * ) Notice: Subject to any disclaimer, the term of this patent is extended or adjusted under 35 U.S.C. 154(b) by 471 days.

(21) Appl. No.: 11/042,958

(22) Filed: Jan. 24, 2005

(65) Prior Publication Data
US 2007/0180013 A1    Aug. 2, 2007

(51) Int. Cl.
G06F 7/38    (2006.01)
G06F 17/00   (2006.01)

(52) U.S. Cl. .......................... 715/745; 713/159; 705/66

(58) Field of Classification Search ................ 715/745; 717/143; 713/159, 172; 705/66; 707/102
See application file for complete search history.

(56) References Cited

U.S. PATENT DOCUMENTS

| | | | | |
|---|---|---|---|---|
| 5,202,828 A | * | 4/1993 | Vertelney et al. ............ | 715/236 |
| 5,850,629 A | * | 12/1998 | Holm et al. .................. | 704/260 |
| 6,029,171 A | * | 2/2000 | Smiga et al. ................ | 707/102 |
| 6,523,172 B1 | * | 2/2003 | Martinez-Guerra et al. . | 717/143 |
| 2004/0017395 A1 | * | 1/2004 | Cook .......................... | 345/745 |

* cited by examiner

*Primary Examiner*—Doug Hutton
*Assistant Examiner*—Daeho D Song
(74) *Attorney, Agent, or Firm*—Townsend and Townsend and Crew LLP

(57) ABSTRACT

A user inputs information, such as a mathematical function, composed of variable strings, functions, characters, expressions, etc., into an information input field connected to a function variable processing system. In one embodiment, the function variable processing system breaks down the information into tokens. The tokens are then processed to detect any undefined user definable tokens, e.g., tokens that the user may add and/or change the definitions associated therewith. The function variable processing system generates a display of the undefined user definable tokens along with any associated token definition input fields and/or menus of token definitions. The user may input token definitions using the token definition input fields and/or may select the token definitions from the menus. The function variable processing system associates the undefined user definable tokens with the definitions inputted by the user to convert the undefined user definable tokens to defined user definable tokens. The user definable tokens and associated user inputted definitions are stored and displayed to the user thereof.

19 Claims, 10 Drawing Sheets

| 206 | SET ID: SHARE   FUNCTION ID: COST-FORM |
|---|---|
| 208 | User Function   Find | View All |   First ◀ 1 of 1 ▶ Last |

—202C

204

210:
- Effective Date: 01/01/2004 (212) 🔍(213)  Active ▼ (214)(215)  SQL Obj ID Prfx:
- Module: Product Pricing Functions    Output Type: 2 Rate (4,8)
- Description: Calculate Costs — 216    ☐ Public Function — 217

Function Statement:   ╱ 220

222B { ABS(NEG_NUM)+ COST + (RATE/2) }

230:
- 231  232    233  234  235
- User Defined: [ ] 🔍  Built In: ABS 🔍  INSERT

241 { Customize Find | View All |    First ◀ 1 of 1 ▶ Last }

250:

| Unknown ID | Record Source | Prompt 1 | Prompt 2 | Description |
|---|---|---|---|---|
| 1 NEG_NUM | DataMap ▼ | AB_MODGEN 🔍 | 15 🔍 | Frozen Rate |
|  | 252  253 | 254  255 | 256  257 | 258 |
| 2 COST | DataMap ▼ | [ ] 🔍 | [ ] 🔍 | [ ] |
|  | 602  603 | 604  605 | 606  607 | 608 |
| 3 RATE | DataMap ▼ | [ ] 🔍 | [ ] 🔍 | [ ] |
|  | 609  610 | 611  612 | 613  614 | 615 |

206 { SET ID: SHARE   FUNCTION ID: COST-FORM

208 { User Function　　　　　　　　　Find | View All |　First ◀ 1 of 1 ▶ Last

210 {
　　　　　　　　212　213　214　215
Effective Date: 01/01/2004 🔍  Active ▼  SQL Obj ID Prfx:
Module:　Product Pricing Functions　Output Type: 2 Rate (4,8)
Description: Calculate Costs
　　　　　　　　　　216　　　☐ Public Function
　　　　　　　　　　　　　　　　217

Function Statement:　　　　　　220
222C { 9 9

231　　232　233　234　235
230 { User Defined:　🔍  Built In: ABS 🔍  INSERT

241 { ─────Customize Find | View All──── First ◀ 1 of 1 ▶ Last

250 { Unknown ID　Record Source　Prompt 1　Prompt 2　Description　} 240
　　　1 ⌐ ⌐　　DataMap ▼
　　　　251　　252  253

FIG. 7

METHOD AND APPARATUS FOR USER FUNCTION VARIABLE PROCESSING SYSTEM AND PROMPT

BACKGROUND OF THE INVENTION

1. Field of the Invention

Embodiments of the invention generally relate to processing information input by users thereof into data processing environments. More particularly, the invention relates to a method of displaying and defining variables included in the user's input.

2. Description of the Related Art

Generally, many conventional software programs such as spreadsheet software, mathematical software programs, word processors, hypertext markup language (HTML) editors, and enterprise software such as customer relationship management (CRM) programs, etc., receive user input such as functions, mathematical expressions, data, character strings, variables, etc., for processing. Other software programs often use an Integrated Development Environment (IDE) to assist computer users and programmers in writing computer programs and develop software applications in the form of source code. The source code is conventionally written in a high-level programming language, e.g., C++, Java, Pascal, etc.

Many software programs and IDE environments allow the user to create functions. For example, spreadsheet programs allow a user to enter functions directly into cells of the spreadsheet. Many software programs such as the mathematical computer aided design program allow the user to enter functions directly into a textual entry area of a graphical user interface (GUI). For many mathematical software programs that can compile and process the user's mathematical function, the mathematical software program monitors and associates what is being entered to stored information. For example, if a user enters an operator "+", the mathematical software program understands from the context that the entry is a mathematical operator. Once the mathematical function is entered, and is contextually understood by the mathematical software program, the user may then instruct the mathematical software program to process the function.

Other conventional software programs and devices such as calculators allow the user to develop mathematical functions piece-by-piece using buttons, menus, and data fields that have fixed context, e.g., fixed meanings. For example, when a user uses a button to enter a variable portion of a mathematical function, because a particular button was used that has a fixed meaning of "variable", the program understands that the entry is a variable. Unfortunately, using buttons, menus, and data fields to generate a mathematical function one piece at a time is often found to be tedious and inefficient.

Generally, such software programs and IDE environments include error detection routines to detect errors with the information received. The programs and IDE environments often generate error messages in response to erroneous and/or unrecognized input by a user and detected by the error detection routines. The error messages are designed to prompt the user to take some action in order to clear the errors. Such error detection routines may operate automatically, and/or may be initiated by the user.

Software programs and IDE environments are often configured with user interfaces and dialog boxes that allow the user to correct errors and/or may offer alternatives to erroneous input. For example, information entered into a cell of many spreadsheet programs may automatically elicit an error message on the spreadsheet display if the spreadsheet program does not recognize the information. If the information was erroneous, the user may elect to correct the erroneous input to clear the error. In some cases where the input is a formula that the spreadsheet program partial understands, it may offer a suggestion to correct the formula. Often a user may input information that is not erroneous but requires additional input. For example, the user may enter a function that includes a variable. Generally, the software program may not understand the function until the variable is defined by associating the variable with some information. Unfortunately, for user input information not understood by the software program, the user generally must ignore and/or cancel the error message, until the additional information is provided. For example, a word processor may provide the user with an error message that includes alternatives for unknown words and/or grammatical errors detected during a grammar/spell checking process. The error message often remains until the user selects a suggested correction, adds the correction, and/or inputs an alternate correction to the word processing program. In another example, an HTML editor may highlight an unknown HTML tag. The HTML editor often keeps the tags highlighted until the user clears the HTML error by correcting the tag. Therefore, such error detection is generally related to correcting a user's input to correct erroneous input until the program recognizes the information.

During mathematical function development, a user may desire to enter user developed elements of the functions directly into the software program that are not recognized by the software program until the mathematical function is further developed and/or further input is introduced by the user to the satisfaction of the software program error correction routines. Unfortunately, as described above, the user is often frustrated, as programs and IDE environments generally do not distinguish between erroneous user input and unrecognized user input that requires further development and/or input. To avoid the error messages, the user is generally forced to either modify their input to what the program understands and/or ignore the error messages. Further, the user may find it difficult, complicated, and time consuming to modify the context of the user developed elements and other elements of the function using software programs that rely on individual buttons, menus, and data fields with fixed meanings.

Therefore, there is a need for a system that allows a user to develop functions in an uncomplicated and efficient manner. There is also a need for the system to allow the user to simply and easily apply and/or modify meanings to portions of the functions being developed.

SUMMARY OF THE INVENTION

One embodiment of the present invention is a method that includes receiving input from a user and detecting a user definable token included in the user's input. The method also includes outputting the user definable token to the user, receiving a token definition from the user for the user definable token, and associating the received token definition with the user definable token.

Another embodiment of the present invention is a system having an input component configured to receive input and at least one token definition from a user. The system also includes a detector configured to detect a user definable token included in the user's input, an output component configured to output the detected user definable token to the user, and a function variable processing system configured to associate the at least one token definition with the user definable token.

Another embodiment of the present invention is a system that includes a means for receiving input and a token definition from the user. The system further includes a means for detecting a user definable token included in the user's input, a means for outputting the detected user definable token, and a means for associating the detected user definable token with the token definition.

BRIEF DESCRIPTION OF THE DRAWINGS

FIG. 6 is a high level illustration of one embodiment of a graphical user interface illustrating an interactive function statement field display for use with the function variable processing system of FIG. 1, in accordance with the invention;

FIG. 7 is a high level illustration of one embodiment of a graphical user interface illustrating an interactive function statement field display for use with the function variable processing system of FIG. 1, in accordance with the invention;

DETAILED DESCRIPTION

Figure 1:
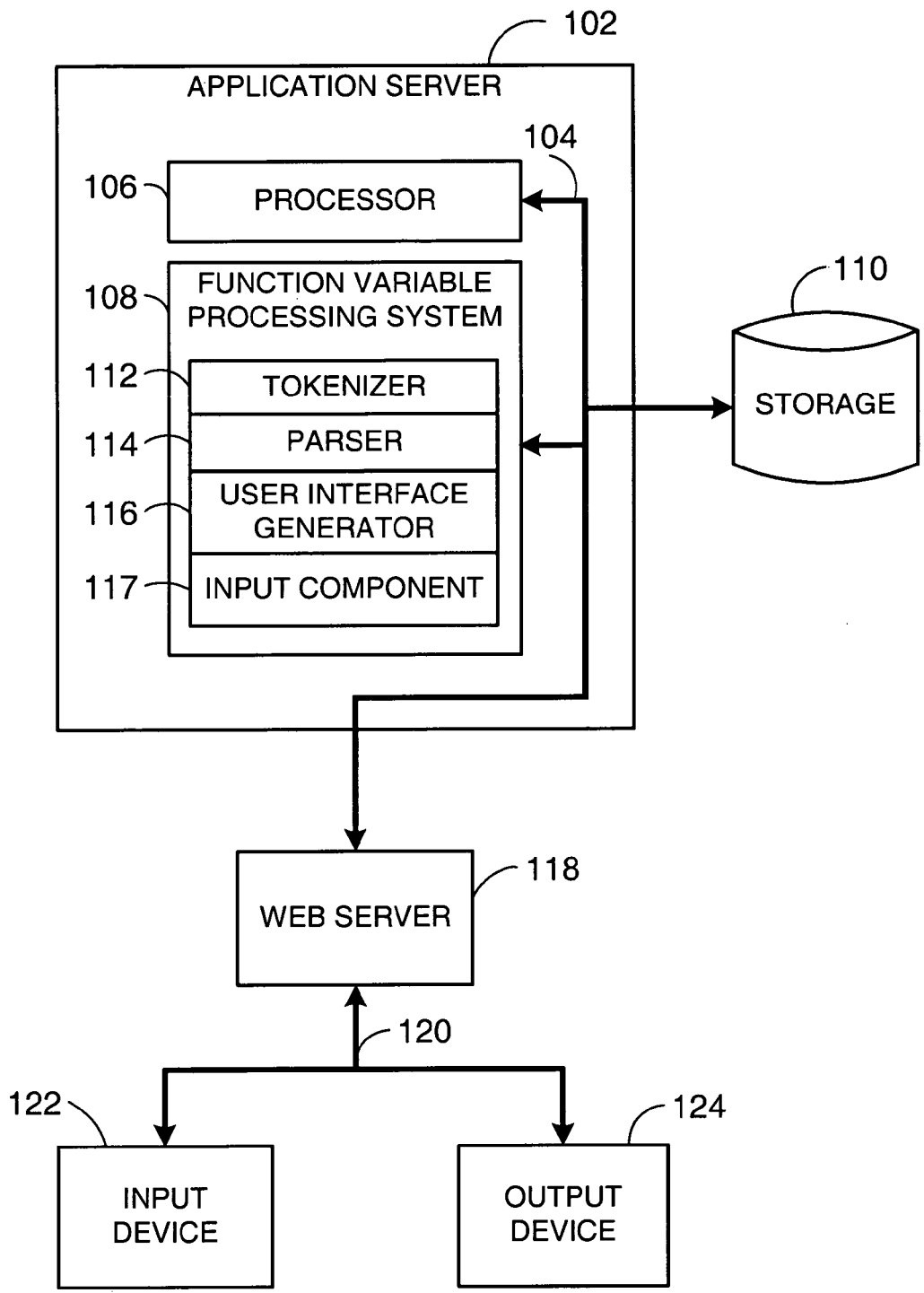
FIG. 1 is a high level block diagram of one embodiment of a function variable processing system, in accordance with the invention.

In general, a user enters information, such as a mathematical equation, through a user interface into a function variable processing system. The function variable processing system divides the information up into tokens. The tokens may be single variables, multiple variables, math functions, and the like. For example, a variable "A" may be considered a token. The tokens may also be user definable or not definable by the user (e.g., un-editable, un-modifiable, unchangeable, etc., by the user).

In one embodiment, the function variable processing system detects defined and undefined user definable tokens included in the user input and generates a display thereof. The function variable processing system provides the user with a display of token definition fields and/or menus to enter and modify token definitions for the displayed defined and undefined user definable tokens. Once the user has entered and accepted the token definitions and/or changes for the displayed user definable tokens, the function variable processing system generates a display of the user definable tokens and the associated token definitions.

For example, if the function variable processing system recognized a user definable token "A" as undefined, the user definable token "A" would be displayed to the user along with one or more user editable token definition fields and/or menus. The user then interactively enters token definitions for the user definable token "A" by entering definitions into the user editable token definition fields and/or by selecting token definitions from the menus. Once the token definitions have been entered and accepted for the user definable token "A", the function variable processing system generates a display of the user definable token "A" along with the newly entered token definitions associated therewith.

As will be described below, aspects of one embodiment pertain to specific method steps implementable on computer systems. In one embodiment, the invention may be implemented as a computer program product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the program product may be developed and implemented independently, but when combined together are embodiments of the invention.

FIG. 1 is a high level block diagram of one embodiment of a processing system 100, in accordance with the invention. Illustratively, the processing system 100 comprises a standalone device. However, the processing system 100 may also comprise a single connected device or a device coupled to a computer network system. In any case, it is understood that FIG. 1 is merely one configuration for the processing system 100. Embodiments of the invention can apply to any comparable configuration, regardless of whether the processing system 100 is a complex multi-user apparatus, a single-user workstation, or a network appliance that does not have non-volatile storage of its own.

The processing system 100 includes an application server 102, a storage device 110, a web server 118, an input device 122, and an output device 124. The application server 102 obtains information from the web server 118 and the storage device 110 using a bus 104. As used herein "information" includes any function, character, variable, symbol, operator, data, values, and the like, regardless of format or length. For example, one type of information is a variable. A variable may be a single character (e.g., letter, numeral, symbol, etc.) or may be a string of characters (e.g., a phrase).

In one embodiment, the application server 102 is configured to receive and process information received from the web server 118 and/or the storage device 110. For example, the application server 102 may be configured to generate an output in response to the information and/or data inputted by a user using the input device 122. The application server 102 may provide output data for display to the user on the output device 124, as described further herein. For example, the application server 102 may be configured to provide an output in response to a mathematical function entered by the user via the input device 122 and data associated therewith as described further herein. The application server 102 may be included with, or represent any type of computer, computer system, or other programmable electronic device that may be used to support the methods, apparatus, and article of manufacture of the present invention.

In one embodiment, the storage device 110 is a direct access storage device (DASD). Although it is shown as a single unit, the storage device 110 could be any type of fixed and/or removable storage device, such as fixed disc drive, floppy disc drive, tape drive, removable memory card, or optical storage. The storage device 110 may also comprise one or a combination of memory devices, including Random Access Memory (i.e., RAM), nonvolatile or backup memory (e.g., programmable or Flash memories, read-only memories, and the like). In one configuration, the storage device 110 is used to store data associated with the user's input. For example, the storage device 110 may include data such as operators, variables, functions, token definitions, and the like associated with the mathematical function input by the user as described further herein.

The web server 118 is configured as an interface between the input device 122, the output device 124, and the application server 102. The web server 118 is coupled to the output device 124 and the input device 122 via an interface bus 120. Generally, the web server 118 is configured to provide data such as Hypertext Markup Language (HTML) using a Hypertext Transfer Protocol (HTTP) to web browser programs (not shown) interfacing with and/or integral to the input device 122 and/or the output device 124. For example, the input device 122 may include a web browser program configured to cooperate with one or more HTML pages generated by the web server 118. The one or more HTML pages may be configured to facilitate a user thereof in displaying and/or inputting information as described further herein. For clarity, embodiments of the invention are described herein in terms of the web server 118 configured as an HTML interface, however, those skilled in the art will recognize that the web server 118 is only one type of interface and is optional as other forms of data processing interfaces may be used. The web server 118 may be included with or represent any type of software program, computer, computer system, or other programmable electronic device configured to function as a web server 118.

The input device 122 can be any device adapted to give input to the processing system 100. For example, a keyboard, keypad, light-pen, touch-screen, track-ball, or speech recognition unit could be used. The output device 124 is preferably any display screen (e.g., a conventional computer monitor). Although shown separately from the input device 122, the output device 124 and the input device 122 could be combined. For example, a display screen with an integrated touch-screen, and a display with an integrated keyboard, or a speech recognition unit combined with a text speech converter could be used.

In one embodiment, the application server 102 includes at least one processor 106 and a function variable processing system 108. The processor 106, the function variable processing system 108, the storage device 110, and the web server 118 communicate with each other and to the web server 118 using the bus 104. The processor 106 may include a microprocessor or central processing unit (CPU). Instructions stored and executed by processor 106 can be implemented in software, hardware, firmware, or any combination thereof. For example, the storage device 110 may be used for storing instructions for the processor 106. The processor 106 may also include other support functions such as read only memory (e.g., ROM), input/output (I/O) ports, and timers. Those skilled in the art will recognize that the processor 106 is configured to receive input using the bus 104, and is further configured to perform various processing instructions on that received input. In short, the processor 106 is configured to perform the functions that a conventional processing unit can perform such as fetching data, storing data, storing instructions, executing instructions, and controlling the functionality of a system, such as the processing system 100.

In one embodiment, the function variable processing system 108 is configured to generate an output of user definable tokens and associated token definitions in response to information entered by the user as described further herein. A user definable token identifies a portion of user's input and/or data, such as a variable or a function, in which the definition (e.g., a type of data format, type of variable, etc.) is modifiable by a user. As described herein, an undefined user definable token is a user definable token that has no user associated token definition. A defined user definable token is a user definable token that has at least one associated token definition.

The function variable processing system 108 is configured to receive information from the user via the input device 122 and communicate that input to the processor 106. The function variable processing system 108 in cooperation with the processor 106 provides the results of the information processing to the output device 124 via the interface bus 120 and the web server 118 as described herein. The function variable processing system 108 includes one or more programs or files that may be written in a programming language such as C, C++, Pascal, Java, and the like. For purposes of illustration, embodiments of the invention will be described with reference to Java. However, the invention is not limited to any particular language.

In one embodiment, the function variable processing system 108 includes a tokenizer 112, a parser 114, a user interface generator 116, and an input component 117. The tokenizer 112 is configured to detect the user definable tokens in the user's input. For example, consider the case of a user's mathematical function input that includes a variable "A". The variable "A" is a user definable token made up of the alphanumeric character "A". If the user definable token "A" has no associated token definitions, then it would be classified as an undefined user definable token by the tokenizer 112. Conversely, if the user definable token "A" has at least one associated token definition, then it would be classified as a defined user definable token. In another example, if a variable string "ABC" represents a user definable token "ABC" then, if the user definable token "ABC" has no associated token definitions, it would be classified as an undefined token. Conversely, if the user definable token "ABC" has at least one associated token definition, it would be classified as a defined token.

In one embodiment, the tokenizer 112 is configured to detect and classify (e.g., flag, mark, tag, etc.) the user's input for user definable tokens according to specified token syntax rules. Table 1 is a partial listing of the token syntax rules that may be used by the tokenizer 112 during a user definable token detection and classification process, examples of which are described herein with respect to FIGS. 2-10.

TABLE 1

Tokenizer Syntax Rules

| Input | Rule |
| --- | --- |
| White Space | Any white space characters at the beginning of the function are skipped. |
| Math Operators | +, −, *, /, and '^' are recognized as math operators ('^' is power) |
| String | Anything enclosed by double quotes is a string: "hello world" |
| Single Quote | A single double quote is considered a syntax error because it's missing the ending quote. |
| Digits | Any combination of digits with or without a single period is considered a number. Examples of numbers are:<br>0.09  is a number<br>.09  is a number<br>1.09  is a number<br>1  is a number |
| Variables | Any alpha character followed by any number of alpha characters or digits, underscores, and periods, are considered variables. Examples of Variables:<br>VAR  is a variable<br>VAR_2  is a variable<br>VAR.3  is a variable<br>2VAR  is not a variable |
| Functions | Any alpha character followed by any number of alpha numeric characters or digits followed by 0 or more white space characters followed by an open parenthesis '(' is a function call. Examples of a function call include:<br>ABS(<br>ABS (<br>ABS_2(<br>A2_A(<br>Examples that are not functions:<br>2A( |
| Syntax Errors | Any character that does not fall under any of the previous rules (not alpha, not digit, not underscore, not period, etc.) is a syntax error. |

In one embodiment, the parser 114 parses the user definable tokens into a series of logic trees for processing by a compiler (not shown). The parser 114 separates the user definable tokens into terminals and non-terminals to generate the logic trees. Terminals are tokens that are not reducible into individual tokens, for processing by the compiler. The parser 114 labels the tokens that cannot be further reduced into individual tokens as "terminals". Terminals include tokens such as mathematical operators "+", "−", etc., that are not reducible into individual tokens. For example, a function statement such as "A+2" includes the tokens "A", a mathematical operator "+", and a number "2" that are not reducible into individual tokens. In this example, the parser 114 labels the tokens "A", "+" and "2" as terminals that cannot be reduced further into individual tokens. Non-terminals are user definable tokens that may be further reduced into individual tokens. Non-terminals include user definable tokens such as functions, variable strings, and the like. The parser 114 labels the user definable tokens that may be reduced further into individual tokens as "non-terminals". For example, the user definable token "ABC" may be labeled by the parser 114 as a "non-terminal" because it is reducible into the individual tokens of "A", "B", and "C".

In one embodiment, the parser 114 is configured to parse the user definable tokens into a logic tree according to specified parsing syntax rules. Table 2 is a partial listing of the syntax rules that may be used by the parser 114 for processing the user definable tokens.

TABLE 2

Parser Syntax Rules

| Syntax Item | Description |
| --- | --- |
| Terminals | Terminals are tokens that cannot be further reduced. The terminals are: plus, minus, multiply, divide, power, left parenthesis, right parenthesis, comma, variable, string literal, number, etc. |
| Non-terminals | Non-Terminals are tokens that can be reduced into individual tokens |
| Function | expression |
| Expression | variable |
| Expression | string literal |
| Expression | Number |
| Expression | Math Operation |
| Expression | Left parenthesis - expression - right parenthesis |
| Expression | variable - left parenthesis - right parenthesis |
| Math Operation | expression - plus - expression |
| Math Operation | expression - minus - expression |
| Math Operation | expression - multiply - expression |
| Math Operation | expression - divide expression |
| Math Operation | expression - power - expression |
| Math Operation | minus - expression |
| Parameter List | parameter list - comma - expression |
| Parameter List | expression |

In one embodiment, the input component 117 is configured to receive the user's input using the bus 104. The input component is further configured to process the input for use by the function variable processing system 108 and processor 106. For example, the input component 117 may receive and process a mathematical function input into processing system 100 by a user though input device 122 as described further herein.

The user interface generator 116 is configured to output information processed by the function variable processing system 108 to a user as described further herein. For example, the user interface generator 116 may be configured to output a graphical user interface (GUI) similar to that illustrated in FIGS. 2-7 described further below.

Figure 2:
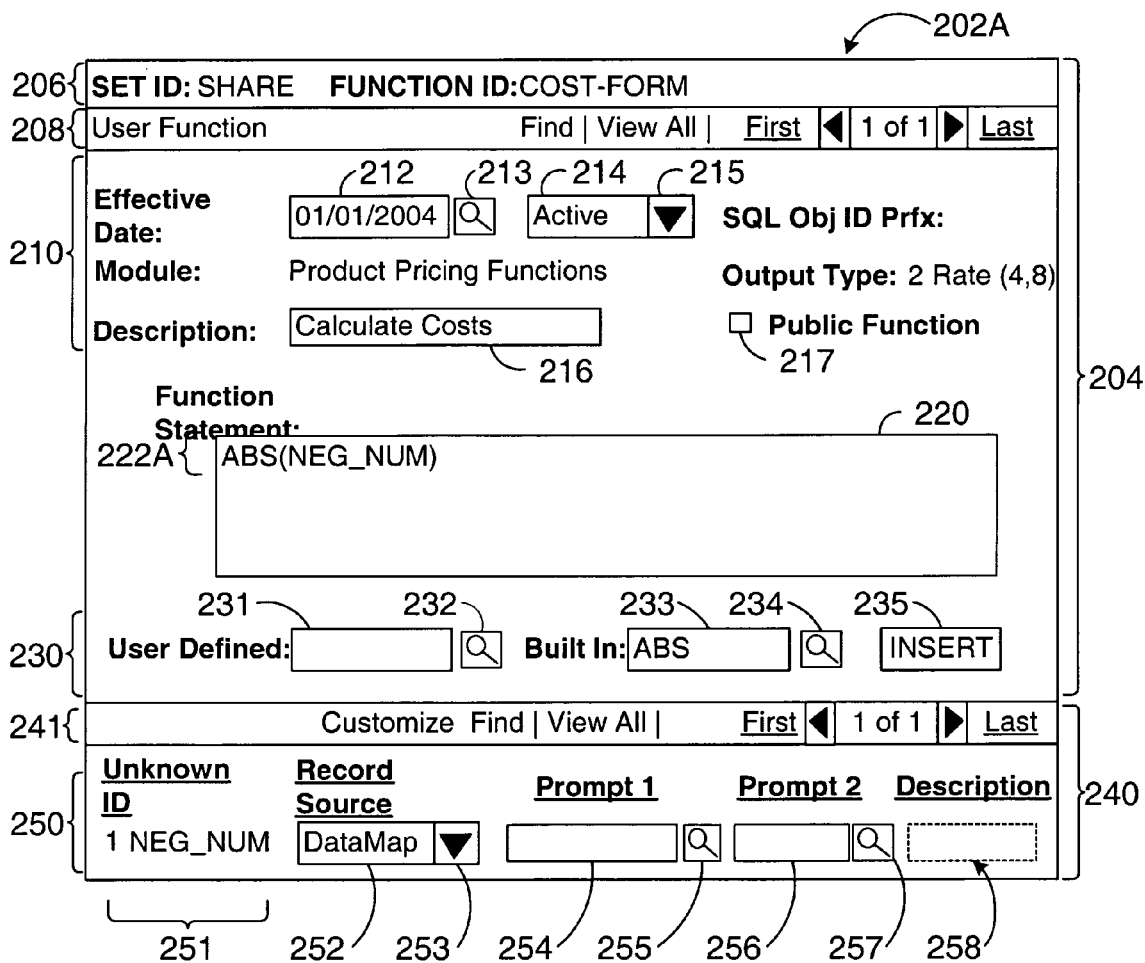
FIG. 2 is a high level illustration of one embodiment of a graphical user interface for use with the function variable processing system of FIG. 1, in accordance with the invention.

FIG. 2 is a high level illustration of one embodiment of a GUI 202A for use with the processing system 100 of FIG. 1, in accordance with the invention. In this illustration, the GUI 202A is configured to provide a user a graphical interface for inputting information input into the processing system 100. The GUI 202A is also configured to provide an interactive user interface for the user to modify information using the input device 122 as described further herein. Illustratively, the GUI 202A may be displayed on the output device 124 communicating with the application server 102 through the web server 118. For clarity, the user's input is described in terms of mathematical functions. However, other types of user information input are contemplated.

FIGS. 2-7 illustrate a process for developing a mathematical function. The data illustrated in FIG. 2, for example, illustrates a user's mathematical function input and associated information, e.g., the type of function, selected and/or entered by a user of the processing system 100. FIGS. 2-7 further illustrate a process for entering a function and one or more token definitions into the processing system 100 via the GUI 202 by a user thereof. FIGS. 2-7 also illustrate a method of using the GUI 202 to graphically assist the user in determining and associating the token definitions for user definable tokens included in the user's input.

In one embodiment, the GUI 202A includes a function display area 204 and a token display area 240. The function display area 204 is configured to display a user's input, such as a mathematical function. The function display area 204 is also configured to display information associated with the user's input and type of mathematical function displayed. For example, the function, display area 204 may display a mathematical function related to determining product cost, and associated information such as the output type, public access, effective dates, and the like, as described further herein.

The function display area 204 includes a label display area 206, a header display area 208, an information display area 210, a function statement field 220, and a built-in function selection display area 230. The label display area 206 is configured to display, for example, the name of the overall function group the function belongs to and the name of the function. Generally, the user determines the overall function group and the name of the function. For example, in this illustration, the label display area 206 shows a set identification ("SET ID") of "SHARE" and a function identification ("FUNCTION ID") of "COST-FORM".

The header display area 208 is configured to facilitate the user in finding and viewing available information associated with the mathematical function being displayed and/or being developed. For example, as illustrated, the header display area 208 contains a "Find", a "View All", a "First", and a "Last" hyperlink display. As illustrated, there is a display indicative of only "1 of 1" pages associated with the GUI 202. The hyperlinks "Find", "View All", "First", and "Last" provide hyperlink navigation to assist the user in finding associated information. For example, if there were more than one displayable page of the "COST-FORM" function, a user selecting the "First" hyperlink in a HTTP environment would be linked to the first page of the "COST-FORM" function.

In one embodiment, the information display area 210 includes text, fields, menus, checkboxes, and the like, associated with information pertaining to the function displayed in the label display area 206 as described further herein. The information display area 210 is configured to assist the user in identifying features and attributes associated with the function being developed. For example, such attributes may indicate the type of function being developed, the function's output data type, the effective date, the description, and the like, as described further herein. For example, as illustrated in FIG. 2, the information display area 210 includes an effective date field 212, a function status menu 214, a function description field 216, and a public access checkbox 217. For this particular illustration, the information display area 210 also includes textual displays of the "SQL Obj ID Prfx" (SQL Object Identification Prefix), the module type, and the output type. The effective date field 212 facilitates a user in establishing an effective date. The effective date field 212 may have an associated search date button 213 to assist the user in entering an effective date. The effective date is defined herein as the date when the function may be performed. In one aspect of the invention, the function status menu 214, in cooperation with a selection button 215, facilitates a user to set the function to an active status, an inactive status, and the like. The function description field 216 facilitates a user to provide a description for the function ID as described below.

In one operational example, as illustrated in FIG. 2, a user developing a mathematical function 222A has input data relevant to the type of mathematical function being developed. For example, the user has begun to define the mathematical function 222A by providing a function ID of "COST_FORM" and a set ID of "SHARE". The user has also entered and/or selected other associated attributes of the mathematical function being developed. In this illustration, the user entered and/or selected an effective date of "Jan. 1, 2004" in the effective date field 212. The user also set the status of the mathematical function "COST-FORM" to "Active" in the function status menu 214. Other optional data associated with the function may be displayed. Illustratively, the information display area 210 includes a function "Module" type display of "Product Pricing Functions", the data "Output Type" is "2 Rate (4,8)" and "Calculate Costs" is displayed in the function "Description" field 216. The "SQL Obj ID Prfx" is blank indicating no SQL prefix. The public access checkbox 217 is blank indicating that the current mathematical function "COST_FORM" is currently private and therefore not accessible to other users of the processing system 100.

In one embodiment, the function statement field 220 allows a user to type a mathematical function in the form of textual input directly into the processing system 100. The function statement field 220 allows the user to input and modify mathematical functions using functional elements known to the processing system 100 such as a math operator, a function, and the like. In addition, the function statement field 220 allows the user to develop one or more mathematical functions using functional elements unknown (e.g., not recognized) to the processing system 100, such as a user defined variable string, as described further herein. For example, as illustrated, the mathematical function 222A "ABS(NEG_NUM)" is an example of a mathematical function "ABS" and "NEG_NUM" is an example of an argument a user has inputted into the function statement field 220.

The function selection display area 230 facilitates the user in locating and inputting built-in and/or user defined mathematical functions into the function statement field 220. The function selection display area 230 includes a user defined function field 231, a built-in function field 233, and a function insert button 235. The user defined function field 231 provides the user the ability to search for user defined mathematical functions. The user defined mathematical functions may include one or more mathematical functions that have been developed by users of the processing system 100 and/or a third party. For example, the mathematical function "COST_FORM" may be considered a user defined mathematical function as it is being developed using the processing system 100. A search button 232 provides the user with the ability to search for such user defined functions. For example, the user may initiate a search routine for such user defined functions by selecting the search button 232.

Figure 5:
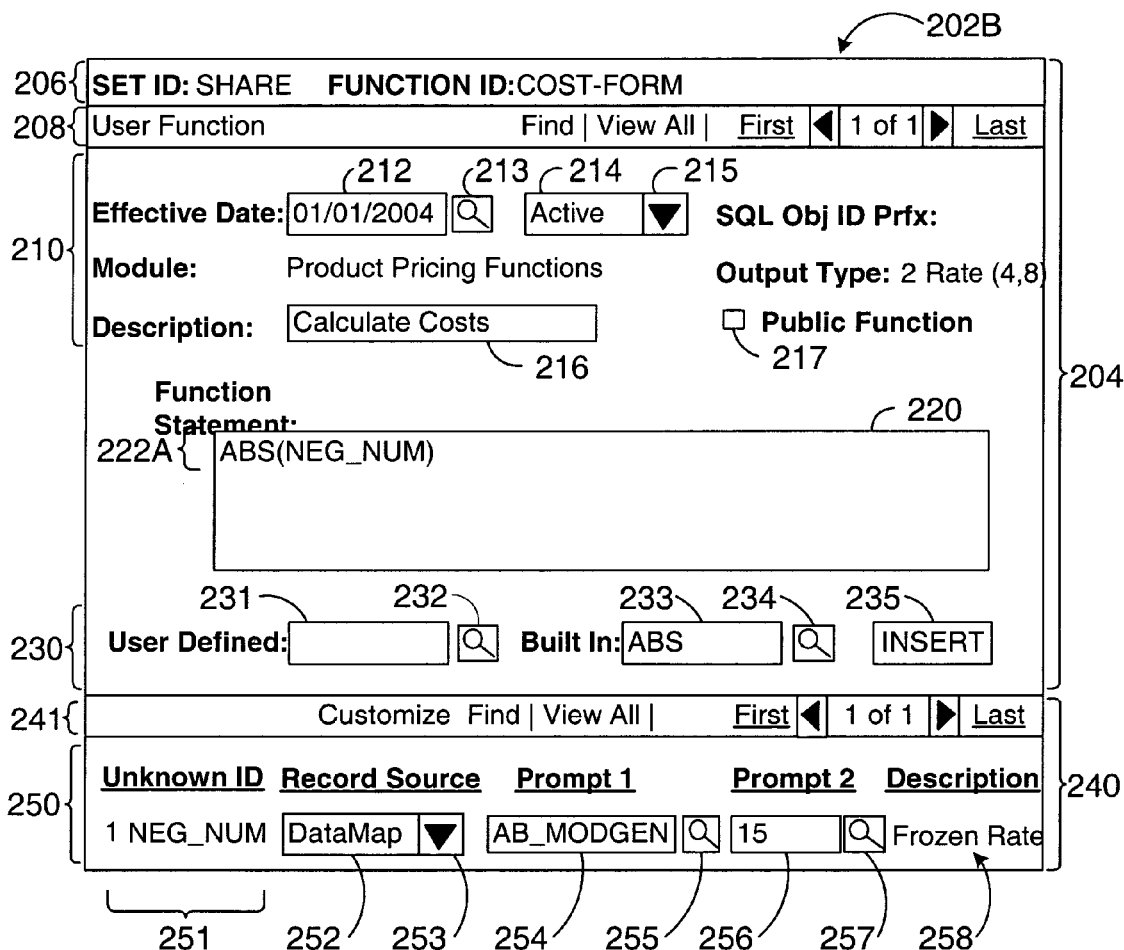
FIG. 5 is a high level illustration of one embodiment of a graphical user interface illustrating an interactive function statement field display for use with the function variable processing system of FIG. 1, in accordance with the invention.

The built-in function field 233 allows a user to select one or more mathematical functions that are built-in to the processing system 100. Such built-in mathematical functions may include known functions such as a ratio formula, absolute value calculations, exponential formulas, and the like. The built-in functions may also include functions specifically designed for a particular application of the processing system 100. For example, the built-in functions may be specific to functions used for accounting or payroll. Selecting a search button 234 initiates a built-in function search routine. For example, as illustrated in FIG. 2 and FIGS. 5-6, a built-in function "ABS( )" is selected from the built-in function field 233 using the search button 234. The built-in function "ABS( )" is displayed in the function statement field 220 after the user operated the function insert button 235. As illustrated, the argument "NEG_NUM" is input by the user into the function statement field 220 within the brackets "( )" of the function "ABS( )".

The token display area 240 displays the user definable tokens detected in the user's input by the processing system 100. The token display area 240 includes a header display area 241 and a definable token display area 250. The header display area 241 is configured to facilitate the user in finding one or more displays of user definable tokens. For example, as illustrated, the header display area 241 contains a "Customize", a "Find", a "View All", a "First", and a "Last" hyperlink display. In this example, there is only a display of one page. This means that "1 of 1" pages of the token display area 240 associated with the illustrated definable token display area 250 are displayed. For example, if there were two pages, the textual display of "1 of 1" would change to "1 of 2" and a user selecting the "First" hyperlink in a HTTP environment would be linked to the first page of the token display area 240.

The definable token display area 250 displays the user definable tokens entered by the user into the functional statement field 220 and processed by the processing system 100. The definable token display area 250 displays the tokens that are definable by the user. For example, the mathematical function 222A "ABS(NEG_NUM)" includes the mathematical function "ABS( )" having a fixed meaning of an absolute value math function. Illustratively, the mathematical function 222A "ABS(NEG_NUM)" includes the user definable token "NEG_NUM" as the argument that may be changed. Therefore, the function "ABS( )" is not displayed, while the user definable token "NEG_NUM" is displayed in the definable token display area 250.

In one embodiment, the user definable tokens included with the mathematical function 222 and the token definitions associated therewith are displayed in the definable tokens display area 250 in a grid pattern, e.g., a display of row and columns of user definable tokens and associated token definitions, as illustrated. in FIG. 2, and FIGS. 5-7. This particular grid configuration as illustrated allows the user to easily associate the user definable tokens and their associated token definitions, however other layouts or arrangements are contemplated. The definable token display area 250 includes an unknown ID display column 251, a record source menu 252, a prompt one field 254, a prompt two field 256, and a description display area 258 for the prompt two field 256. For example, as illustrated in FIG. 2 and FIG. 5-6, the user definable token "NEG_NUM" is listed in a first row (designated row "1" in FIG. 2 and FIG. 5-6) of the definable token display area 250. The user definable token "NEG_NUM" is displayed within the unknown ID display column 251 under a column header entitled "Unknown ID" as shown in FIG. 2 and FIG. 5-6. In this particular illustration of FIG. 2, the user definable token "NEG_NUM" is undefined (e.g., presently unknown by the processing system 100). Therefore, the user definable token "NEG_NUM" has no associated token definitions at this point in the function development process described herein. Consequently, the prompt one field 254, the prompt two field 256, and the description display area 258 are blank as described further below.

In one configuration, the record source menu 252 is located under a column header entitled "Record Source" as shown in FIG. 2 and FIG. 5-6. The prompt one field 254 is located under a column header entitled "Prompt 1" as shown in FIG. 2 and FIG. 5-6. The prompt two field 256 is located under a column header entitled "Prompt 2" as shown in FIG. 2 and FIG. 5-6. The description display area 258 is located under a column header entitled "Description" as shown in FIG. 2 and FIG. 5-6.

The record source menu 252 is used to define the data type of a user definable token being displayed, e.g., "NEG_NUM". The record source menu 252 is displayed under the column of "Record Source". The menu of available data types is accessible and selectable by a menu button 253. For example, data types may include token definitions such as DataMap, DataSet, Parameter, State record (Record), and the like. In this case, the user selected "DataMap" as the token definition using the menu button 253 thus providing a token definition for the undefined user definable token. Similarly, the user could use the menu button 253 to select another data type such as "Parameter".

The prompt one field 254, the prompt two field 256, and the description display area 258 provide additional token definitions and information associated with the token definition selected in the record source menu 252 as described further herein. The token definitions accessible through the prompt one field 254 and the prompt two field 256 may be built-in, e.g., part of a default set of token definitions, for example. In addition, the token definitions accessible through the prompt one field 254 and the prompt two field 256 may user defined, e.g., developed by a user of the processing system 100 and/or a third party. In one configuration, token definitions may be directly entered by the user into the prompt one field 254 and/or the prompt two field 256. A search button 255 may be used to initiate a search for built-in and/or user defined token definitions associated with the prompt one field 254 as described below with respect to FIG. 3. A search button 257 may be used to initiate a search for token definitions associated with the prompt two field 256 as described below with respect to FIG. 4.

Figures 3A, 3B:
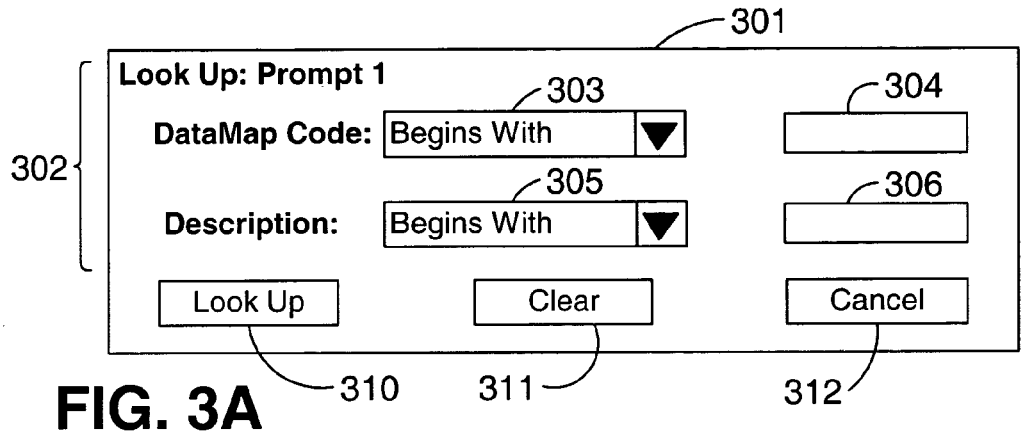
FIG. 3A is a high level illustration of one embodiment of a dialog box generated through interaction with the graphical user interface of FIG. 2, in accordance with the invention.
FIG. 3B is a high level illustration of one embodiment of a graphical user interface providing a results display using the graphical user interface of FIG. 3A, in accordance with the invention.
Figures 4A, 4B:
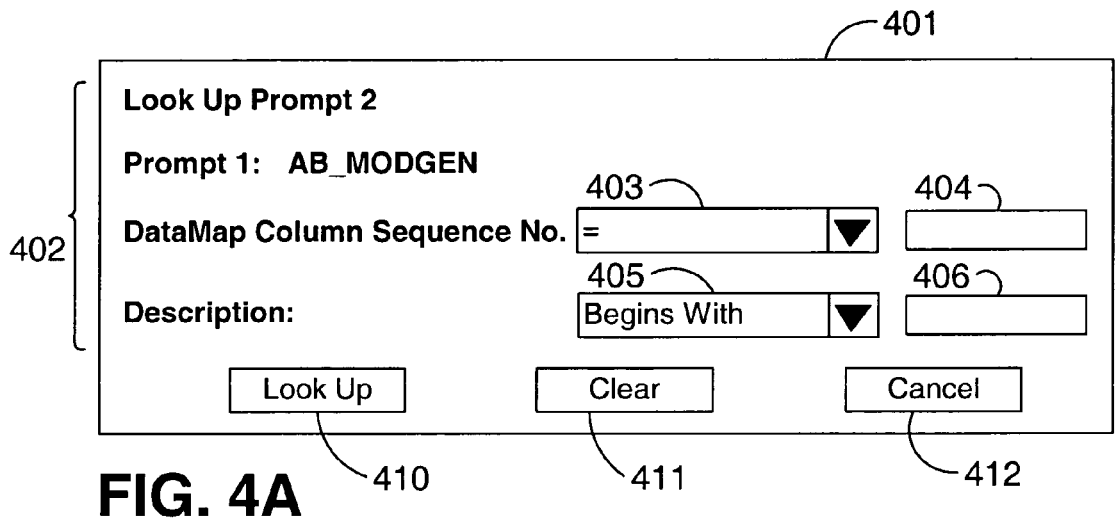
FIG. 4A is a high level illustration of one embodiment of a dialog box generated through interaction with the graphical user interface of FIG. 2, in accordance with the invention.
FIG. 4B is a high level illustration of one embodiment of a graphical user interface providing a results display using the graphical user interface of FIG. 4A, in accordance with the invention.

To initiate a token definition search for the prompt one field 254, a user operates the search button 255 to activate a search dialog box for the prompt one field 254, an example of which is illustrated in FIG. 3A described below. The search dialog box for the prompt one field 254 is configured to allow a user to search for built-in and/or user defined token definitions associated with the prompt one field 254. Similarly, the user may operate the search button 257 to activate a search dialog box for the prompt two field 256, an example of which is illustrated in FIG. 4A described below. The search dialog box for the prompt two field 256 is configured to allow a user to search for token definitions associated with the prompt two field 256 as described below. In one embodiment, after the user chooses a data type from the record source menu 252, the search button 255 and the search button 257 provide the user access to token definitions and information specifically generated for the data type selected, as described further below with respect to FIGS. 3-4.

FIG. 3A is a high level illustration of one embodiment of a dialog box 301 generated through interaction with the GUI 202 of FIG. 2, in accordance with the invention. FIG. 3B is a high level illustration of one embodiment of a GUI 320 providing a display of the results of the token definition search process initiated at FIG. 3A, in accordance with the invention. Upon the dialog box 301 activation, as described above, the user is provided with the ability to search for token definitions associated with the prompt one field 254 and record source menu 252 of FIG. 2, and FIGS. 5-6 described herein.

Referring now to FIG. 3A, the dialog box 301 includes a description display area 302. The processing system 100 configures the description display area 302 to display information related to the token definition search. For example, consider the case where a user is searching for token definitions associated with datamaps. As illustrated in FIG. 3A, the processing system 100 configures the description display area 302 to include labels associated with datamaps such as "Look Up Prompt 1", "DataMap Code", and "Description", described further herein.

The dialog box 301 includes a search menu 303 and an associated input field 304. The dialog box 301 also includes a search menu 305 and an associated input field 306. In one embodiment, the search menu 303 allows the user to search for token definitions using a search criteria such as "begins with", "does not contain", "is equal to", and the like. The user inputs a name, or a portion thereof, of the token definition into the input field 304, e.g., a name of a datamap code. Similarly, the search menu 305 allows the user to search for user defined token definitions using a search criteria such as "begins with", "does not contain", "is equal to", and the like. The user inputs a description, or a portion thereof, of the token description into the input field 306, e.g., a description of a data map code. In this illustration, the search menu 303 and the associated input field 304 are associated with label "DataMap Code" indicating that the user may search using the name of the datamap code. The search menu 305 and the associated input field 306 are associated with label "Description" indicating that the user may search using the description of the datamap code.

The dialog box 301 includes a look up button 310, a clear button 311, and a cancel button 312. In one operational embodiment, after entering the name of the token definition and/or description, or portion thereof, as described above, the user may initiate a token definition search by operating the look up button 310 as described further below. The user may clear information input for the search by selecting the clear button 311. The user may cancel a search by selecting the cancel button 312.

Upon operation of the look up button 310, referring now to FIG. 3B, the processing system 100 displays the results of a search to the user as the GUI 320, for example, on the output device 124. For example, consider the case where a user initiates a search for a token definition for datamaps. Further, consider the case that the token definition is associated with a listing of data map codes that are accessible to the processing system 100. As illustrated in FIG. 3B, when the processing system 100 has completed a search for datamap code information, a listing of the datamap codes 322 and associated descriptions 323 are generated by the processing system 100 and displayed as a GUI 320. The user can select from any of the listed datamap codes 322 and the associated datamap descriptions 323. For example, as illustrated, if the datamap code row 324 is selected, it would include a datamap code 322 "AB_MODGEN" and an associated token description 323 "Data For Model Generation". Upon selection, the token definition is then displayed in the prompt one field 254 as illustrated in FIGS. 5-6 described further herein.

In one configuration, the GUI 320 includes a header display area 321 configured to assist the user in navigating through the search results provided by the processing system 100. For example, as illustrated, the header display area 321 contains a "View All", a "First", and a "Last" hyperlink display. As illustrated, there is a display indicative of "1-40 of 75" data map codes 322 displayed in the GUI 320. The hyperlinks "View All", "First", and "Last" provide hyperlink navigation to assist the user in navigating through the search results. For example, operating the "Last" hyperlink may provide a display "41-75 of 75" of the data map codes 322.

Similarly to FIG. 3 described above, FIG. 4A is a high level illustration of one embodiment of a dialog box 401 generated through interaction with the GUI 202 of FIG. 2, in accordance with the invention. FIG. 4B is a high level illustration of one embodiment of a GUI 420 providing a search results display from operation of the dialog box 401 of FIG. 4A, in accordance with the invention.

Referring now to FIG. 4A, in one embodiment, the dialog box 401 allows the user to search for token definitions for the prompt two field 256 that are associated with the token definition entered into the prompt one field 254 described herein. For example, consider the case where the user is searching for token definitions related to datamap codes selected for the prompt one field 254. The dialog box 401 allows the user to search for token definitions associated with datamap codes such has DataMap, DataSet, Parameter, State record (Record), and the like.

The dialog box 401 includes a description display area 402. The processing system 100 configures the description display area 402 to display the type of token definition search. For example, as illustrated in FIG. 4, the processing system 100 configures the description display area 402 to display data map code labels "AB_MODGEN", and other related information such as labels "DataMap Column Sequence No.", and "Description", described further below.

In one embodiment, to allow the user to enter search information, the dialog box 401 also includes a search menu 403 and associated input field 404. The search menu 403 allows the user to search token definitions, such as datamap column sequence numbers, accessible to the processing system 100 using a search criteria. For example, the search criteria may include "=" (equal), < (less than), > (greater than), etc. The user inputs the name of the token definition, or a portion thereof, into the input field 404 to further refine the search. In this illustration, the search menu 403 and associated input field 404 are associated with the label "DataMap Column Sequence No." displayed in display area 402. Therefore, the user may input a datamap column sequence number, or a portion thereof, into the input field 404 to further refine the search, e.g., 1, 2, 3, etc.

Similarly, the dialog box 401 further includes a search menu 405 and an associated input field 406. The search menu 405 provides the user with a search criteria such as "begins with", "includes", and the like. The user inputs a description of the token definition, or a portion thereof, into the input field 404 to further refine the search. In this illustration, the search menu 405 and the associated input field 406 are associated with the label "Description". Therefore, the user may input a description, or portion thereof, of a datamap column sequence number, into the input field 404 to further refine the search, e.g., Business unit, Scenario, a partial word such as "Bus", etc. The dialog box 401 also includes a look up button 410, a clear button 411, and a cancel button 412. The user can initiate a search by selecting the look up button 410. The user can clear picked entries by selecting the clear button 411. The user can cancel the search operation by selecting the cancel button 412.

In one operational embodiment, consider the case where a user is searching for token definitions related to the data map code "AB_MODGEN". As illustrated in FIG. 4A, the description display area 402 shows the display of "Prompt 1: AB_MODGEN" indicating that the user can search for token definitions related to the data map code "AB_MODGEN". The description display area 402 also shows "DataMap Column Sequence No." indicating that the user may search for token definitions using a data map column sequence number. The description display area 402 further shows "Description" indicating that the user may search for data map column sequence numbers using their description.

As illustrated in FIG. 4B, upon the user entering search criteria data as described above and operating the look up button 410, a listing of DataMap column sequence numbers 422 and associated DataMap descriptions 423 associated with the data map code "AB_MODGEN" are displayed as the GUI 420. The user may select from any of the listed datamap column sequence numbers 422 and the associated datamap descriptions 423. For example, as illustrated, the row 424 having a datamap column sequence number of "15" and an associated description of "Frozen Rate" may be selected. As shown in FIGS. 5-6 described further below, the information selected pertaining to the datamap column sequence number (e.g., "15") 422 is then displayed in the prompt two field 256 and the description (e.g., Frozen Rate) of the datamap column sequence number (e.g., 15) 422 is displayed in the description display area 258.

In one configuration, the GUI 420 includes a header display area 421 configured to assist a user in navigating through the search results provided by the processing system 100. For example, as illustrated, the header display area 421 contains a "View All", a "First", and a "Last" hyperlink display. As illustrated, there is a display indicative of "1-35 of 40" data map column sequence numbers 422 displayed that are available to be displayed on the GUI 420. The hyperlinks "View All", "First", and "Last" provide hyperlink navigation to assist the user in navigating through the search results. For example, operating the "Last" hyperlink may provide a display "36-40 of 40" of the data map column sequence numbers 422.

FIG. 5 is a high level illustration of one embodiment of a GUI 202B illustrating the function statement field 220 with a mathematical function 222A input by a user into the processing system 100 of FIG. 1, in accordance with the invention. FIG. 5 illustrates the defined user definable tokens from the user's input and the definitions entered as described in the discussion of FIGS. 2-4 described above. For example, as illustrated in row 1 displayed in the definable token display area 250, the user definable token "NEG_NUM" is displayed in the unknown ID display column 251 and its associated token definition "DataMap" is displayed in the record source menu 252. Further, its associated token definition "AB_MODGEN" is displayed in the prompt one field 254, the token definition "15" is displayed in the prompt two field 256, and the description for the prompt two field 256 "Frozen Rate" is displayed in the description display area 258.

FIG. 6 is a high level illustration of one embodiment of a GUI 202C illustrating the function statement field 220 with a mathematical function 222B entered by a user into the processing system 100 of FIG. 1, in accordance with the invention. In one embodiment, FIG. 6 illustrates the user definable tokens from the function 222B and the definitions entered from the process illustrated in FIGS. 2-4 described above. For example, user definable tokens "NEG_NUM", "COST", and "RATE" from the mathematical function 222B "ABS(NEG_NUM)+COST+(RATE/2)" are displayed in the definable token display area 250 in the unknown ID display column 251. The user definable tokens "NEG_NUM", "COST", and "RATE are placed in unknown ID display column 251 and displayed as follows: "NEG_NUM" is displayed in row 1, "COST" is displayed in row 2, and "RATE" is displayed in row 3. As described herein, the processing system 100 need not display other information that is included in the mathematical function 222B that is not definable by the user. For example, the operators "+", "/", and the number "2" from the mathematical function 222B need not be displayed in the definable token display area 250.

In one configuration, the processing system 100 generates an associated grid display in response to the user inputting one or more user definable tokens and associated token definitions. Each row associated with the user definable token input by the user contains associated token definition fields and menus as described herein. For example, in row 1, the user definable token "NEG_NUM" has the record source menu 252 and the associated menu button 253, the prompt one field 254, the prompt two field 256, and the description display area 258 as described above. However, in this illustration, the user has just begun to provide definitions for the undefined user definable token "COST" in row 2 and "RATE" in row 3. Therefore, in row 2, the undefined user definable token "COST" has a record source menu 602 and the associated search button 603, the prompt one menu 604 with an associated search button 605, a prompt two menu 606 with an associated search button 607, and a description display area 608. In row 3, the undefined user definable token has a record source menu 609 and an associated search button 610, a prompt one menu 611 with an associated search button 612, a prompt two menu 613 with an associated search button 614, and a description display area 615, described further below.

In one configuration, the processing system 100 configures and displays the associated fields and menus described herein with default states, e.g., a null state, for undefined user defined tokens. For example, as illustrated in FIG. 6, the definable token display area 250 provides a display of user definable tokens associated with the mathematical function 222B "ABS(NEG_NUM)+COST+(RATE/2)" where the user definable token "NEG_NUM" is defined and the user definable tokens "COST", and "RATE" are undefined. The definable token display area 250 displays the user definable token "NEG_NUM" with associated token definitions input via the process illustrated in FIGS. 2-4. The definable token display area 250 displays the undefined user definable tokens "COST" and "RATE" with default values. For example, the record source menu 602 and the record source menu 603 are set to a default token definition of "datamap". Further, for the undefined user definable tokens "COST", the prompt one menu 604, the prompt two menu 606, and the description display area 608 are set to a blank default state. For the undefined user definable tokens "RATE", the prompt one menu 611, the prompt two menu 613, and the description display area 615 are set to a blank default state.

FIG. 7 is a high level illustration of one embodiment of a GUI 202D illustrating the function statement field 220 with a mathematical function 222C entered by a user into the processing system 100 of FIG. 1, in accordance with the invention. In one embodiment, FIG. 7 illustrates the mathematical function 222C "9 9" entered into the function statement field 220 by a user. In this case, the mathematical function 222C has no defined or undefined user definable tokens according to the syntax rules of Table 1, for example, and therefore no user definable tokens are listed in the definable token display area 250. In addition, due to the lack of an operator such as "+" between the text "9 9" of mathematical function 222C, the processing system 100 would recognize the missing operator as a syntax error according to the syntax rules of Table 2, and may alert the user thereof.

In summary, in one embodiment, the processing system 100 includes the function variable processing system 108. The function variable processing system 108 generates the GUI 202. The GUI 202 includes the function display area 204 and the token display area 240. The function display area 204 includes the function statement field 220. The function statement field 220 is configured to accept textual information input such as functions, variables, and the like, from the user. The function variable processing system 108 processes the user's input to detect the user definable tokens in the user's input. The function variable processing system 108 configures the token display area 240 to display the defined and undefined user definable tokens associated with the user's input. The token display area 240 also displays interactive fields and menus via the definable token display area 250 associated with the user definable tokens being displayed. The user associates token definitions to the user definable tokens displayed using the interactive fields and menus generated by the function variable processing system 108. The function variable processing system 108 stores the user definable tokens and associated token definitions. The function variable processing system 108 configures the definable token display area 250 to display the user definable tokens and the associated token definitions.

Figure 8:
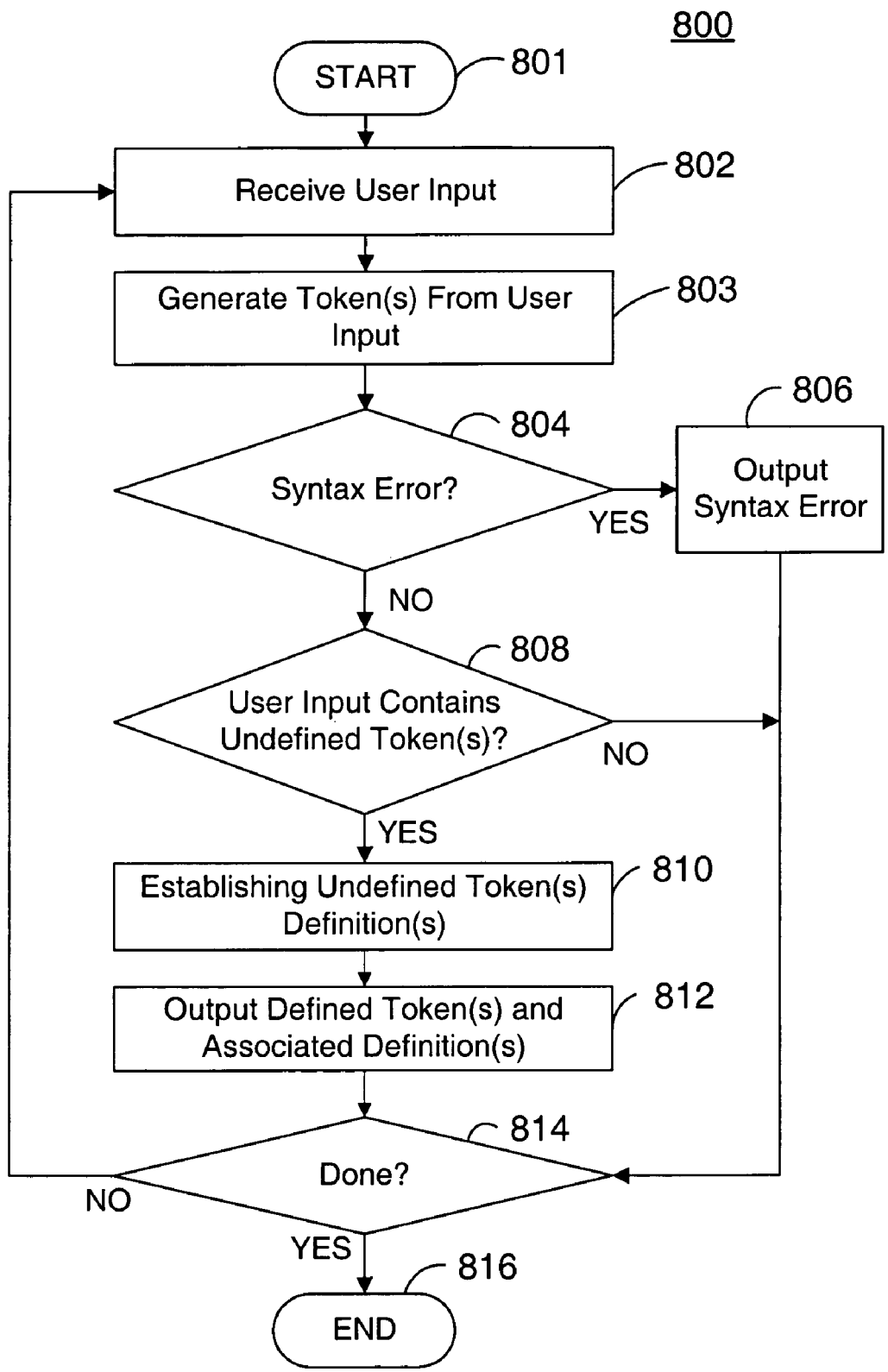
FIG. 8 is a flow diagram of one embodiment of a method of defining undefined information associated with the user's input, in accordance with the invention.

FIG. 8 is a flow diagram of one embodiment of a method 800 of defining unrecognized information associated with the user's input (e.g., the mathematical function 222), in accordance with the invention. The particular steps and sequence of steps are merely illustrative and other embodiments are contemplated.

The method 800 may be entered into at step 801 when, for example, the function variable processing system 108 is operated. At step 802, the method 800 receives user input information, e.g., the mathematical function 222. For example, the user inputs the mathematical function 222 into the function statement field 220. At step 803, the method 800 generates user definable tokens from the user's input received at step 802. For example, the tokenizer 112 receives and detects the user definable tokens in the user's input.

The user's input is checked for syntax errors with the information input at step 804. For example, the parser 114 may check the user's input for syntax errors as described herein. In one embodiment, the method uses the syntax rules from Table 2 to determine the syntax errors. If there are any syntax errors, the user is provided an error output at step 806. Those skilled in the art will appreciate that syntax error checking is an optional step. If there are no syntax errors detected at step 804, the method 800 determines if any of the user definable tokens generated at step 803 are undefined at step 808. If at step 808 the method determines that there are no undefined user definable tokens, the method 800 proceeds to step 814. However, if at step 808 the method 800 determines there are undefined user definable tokens, then the method 800 proceeds to step 810. If the method 800 determines that there are undefined user definable tokens, the undefined user definable tokens are then defined at step 810. At step 812, the method 800 outputs the user definable tokens and their associated token definitions. For example, the function variable processing system 108 generates the GUI 202 facilitating the user in defining the user definable tokens as described herein and displaying the results on the output device 124. At step 814, if the method 800 is finished, then the method 800 proceeds to step 816 and ends. For example, the method 800 may be finished processing the user's input. If however, the method 800 is not finished, then the method 800 proceeds to step 802.

Figure 9:
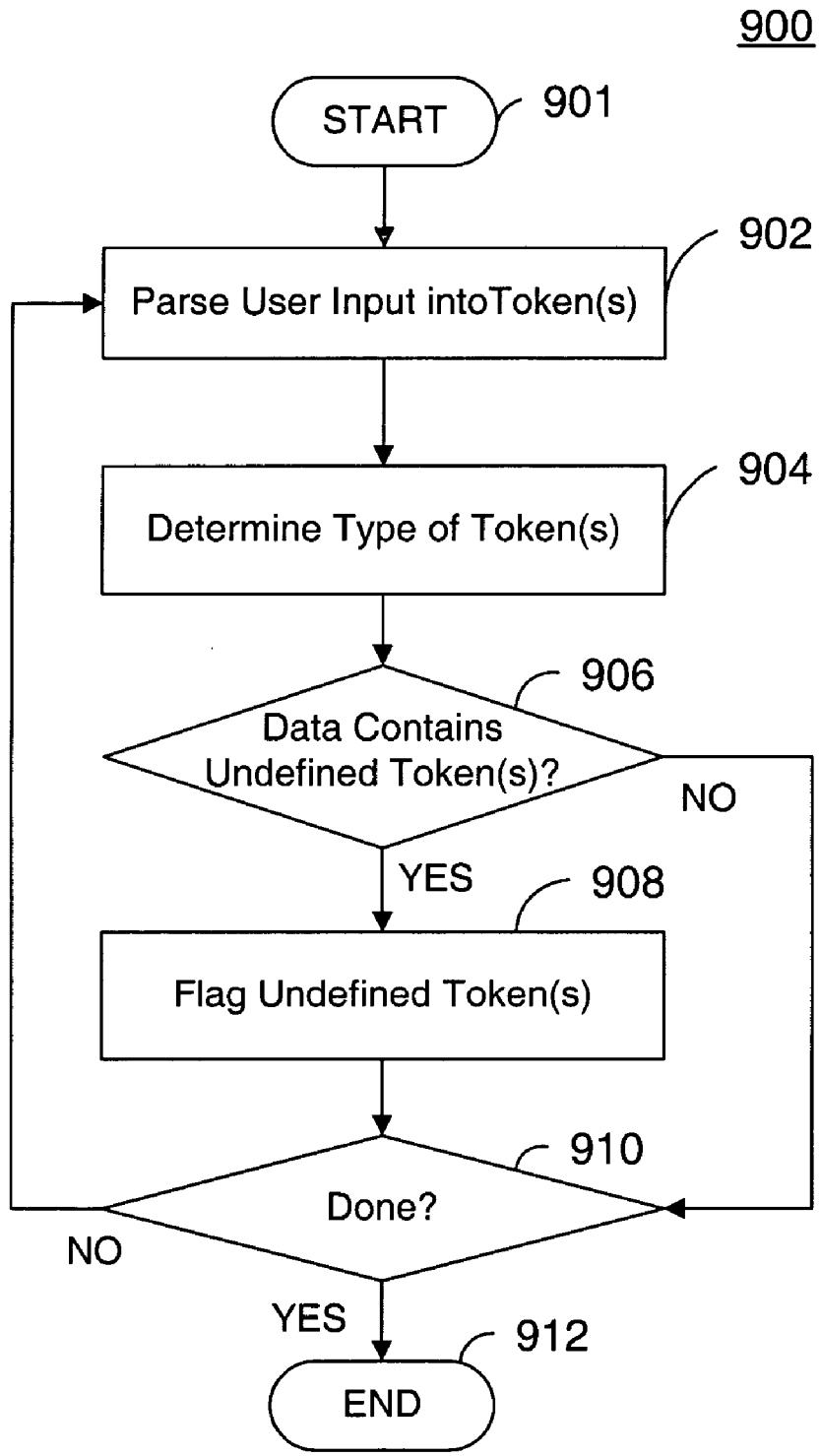
FIG. 9 is a flow diagram of one embodiment of a method of detecting and flagging undefined information associated with the user's input, in accordance with the invention.

FIG. 9 is a flow diagram of one embodiment of a method 900 of detecting and flagging unrecognized information (e.g., undefined user definable tokens) associated with the user's input, in accordance with the invention. The method 900 may be entered into at step 901 when, for example, the method 800 is generating tokens from a user's input at step 803 described above with respect to FIG. 8. At step 902, the method 900 detects tokens included in the user's input, e.g., the mathematical function 222. For example, the tokenizer 112 receives the user's input from the input component 117 and parses the user's input into user definable tokens and tokens that are not user definable.

At step, 904 the method 900 detects the user definable tokens in the user's input and determines if the user definable tokens are defined. For example, the tokenizer 112 may detect the user definable tokens in the user's input using rules, such as the syntax rules found in Table 1, and then determine if the user definable tokens are defined by checking to see if the token has any associated token definitions inputted by a user.

At step 906, if no user definable tokens are undefined, then method 900 proceeds to step 910 described below. If however, at step 906 there is at least one undefined user definable token, the method 900 proceeds to 908 and flags the undefined user definable token as not defined. For example, the tokenizer 112 flags a detected undefined user definable token as "not defined". At step 910, if the method 900 is finished, then the method 900 proceeds to step 912 and ends. For example, the method 900 may be finished detecting undefined user definable tokens. If however, the method 900 is not finished, then the method 900 proceeds to step 902.

Figure 10:
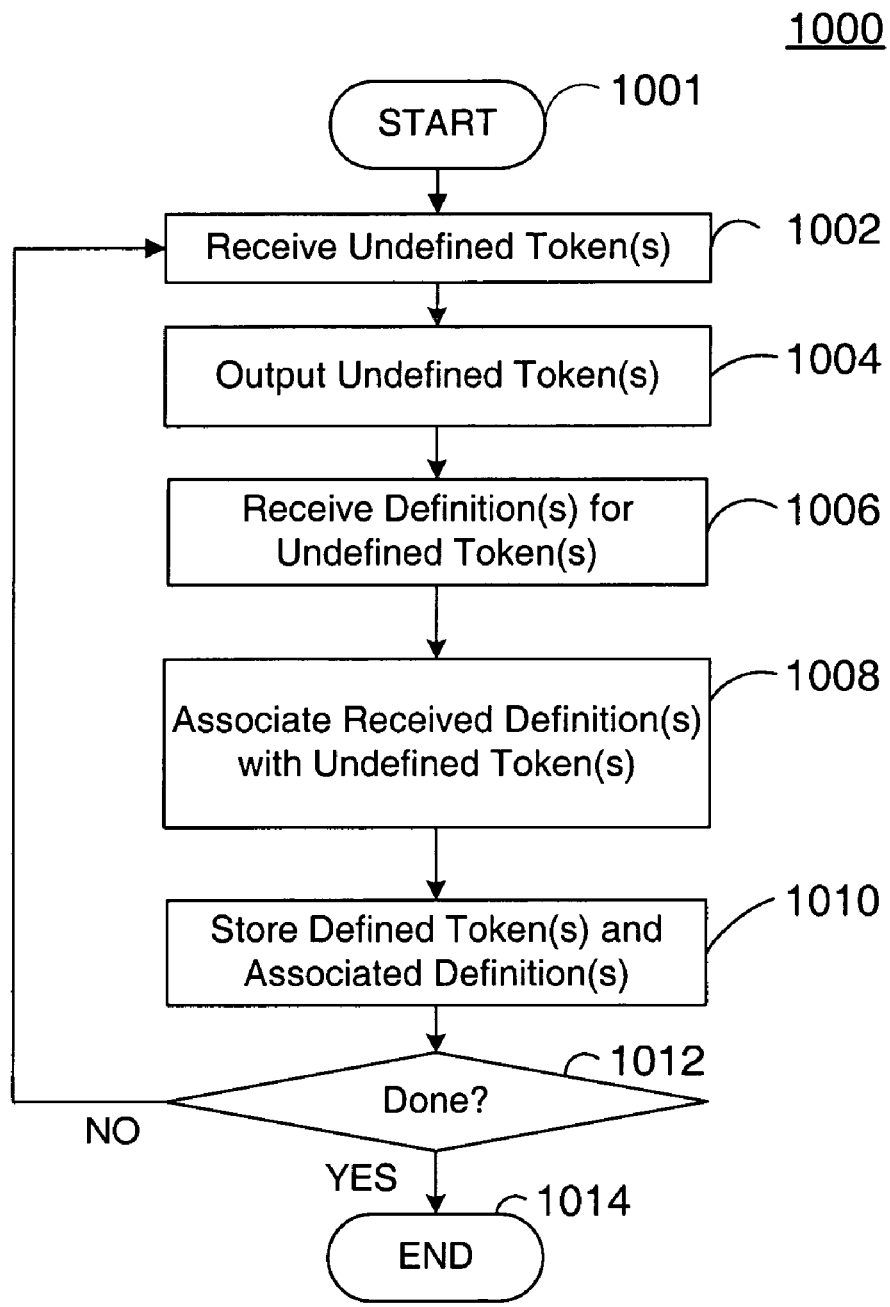
FIG. 10 is a flow diagram of one embodiment of a method of associating definitions with undefined information included with the user's input, in accordance with the invention.

FIG. 10 is a flow diagram of one embodiment of a method 1000 of associating one or more token definitions with one or more undefined user definable tokens included with the user's input, in accordance with the invention. The method 1000 may be entered into at step 1001 when, for example, the method 800 described above with respect to FIG. 8 is establishing one or more user definable token definitions from the user's input at step 812.

At step 1002, the method 1000 receives one or more undefined user definable tokens from the user's input. For example, the method 1000 receives the undefined user definable token "NEG_NUM" as illustrated and described regarding FIGS. 2-4 associated with function 222A via the input component 117. At step 1004, the method 1000 outputs the one or more undefined user definable tokens. For example, the function variable processing system 108 may display the undefined user definable token "NEG_NUM" within the token display area 250 as shown in FIG. 2 and FIGS. 5-6 on output device 124. At step 1006, the method 1000 receives one or more token definitions from the user. For example, the user may associate one or more token definitions with one or more undefined user definable tokens using the function variable processing system 108 configuring the token definition fields and menus of GUI 202 as described herein. The one or more token definitions are then associated with the one or more undefined user definable token at step 1008 converting the one or more undefined user definable tokens to one or more defined user definable token. For example, the function variable processing system 108 receives a token definition from the user such as "datamap" and associates it with the undefined user definable token "NEG_NUM" as illustrated in FIGS. 2-7. At step 1010, the defined user definable token and its associated one or more token definitions are stored. For example, the defined user definable token and its associated one or more token definitions are stored using the storage device 110. If the method 1000 is finished at step 1012, the method 1000 proceeds to step 1014 and ends. The method 1000 may be finished if the user has for example finished inputting a mathematical function into GUI 220 or the method 800 has finished processing all of the defined user definable tokens and associated token definitions associated with the user's input. If however, if the method 1000 is not finished, then the method 1000 returns to step 1002.

The invention has been described above with reference to specific embodiments. Persons skilled in the art, however, will understand that various modifications and changes may be made thereto without departing from the broader spirit and scope of the invention as set forth in the appended claims.

The invention claimed is:

1. A method of processing a mathematical function input by a user, comprising:
    receiving input from a user defining a mathematical function including a set of terminal tokens and non-terminal tokens, wherein a non-terminal token is reducible to at least one terminal token;
    reducing the non-terminal tokens into terminal tokens;
    parsing the terminal tokens to identify any syntax errors in the input from the user, wherein the identification of a syntax error will cause a notification to be provided to the user;
    parsing the terminal tokens into predefined tokens and user definable tokens, wherein user definable tokens are definable only by the user;
    parsing the user definable tokens into defined user definable tokens and undefined user definable tokens, the defined user definable tokens having been previously fully defined by the user and undefined user definable tokens having not been previously defined by the user;
    displaying each undefined user definable token to the user; and
    receiving a token definition from the user for each undefined user definable token and associating the received token definition with the respective undefined user definable token,
wherein the association causes the undefined user definable token to become a new defined user definable token and the received token definition is persistently associated with all instances of the new defined user definable token,
wherein each token in the function is parsed such that the mathematical function can be processed to obtain a desired result.

2. The method of claim 1, wherein determining if the user definable token is undefined comprises comparing the user's input to a database of user definable tokens.

3. The method of claim 1, wherein the user's input comprises user definable tokens, numbers, function calls, terminals, non-terminals, and combinations thereof.

4. The method of claim 1, wherein displaying comprises providing a means for defining the undefined user definable token.

5. The method of claim 1, wherein receiving the token definition comprises providing the user with a graphical user interface to provide the token definition.

6. A system including executable instructions on a computer readable storage medium for processing a mathematical function input by a user, comprising:
    an input component configured to receive input from a user defining a mathematical function including a set of terminal tokens and non-terminal tokens, wherein a non-terminal token is reducible to at least one terminal token;
    a parsing component programmed to reduce the non-terminal tokens into terminal tokens, the parsing component being further programmed to identify any syntax errors in the user in put and notify the user of the syntax error;
    a detector programmed to detect predefined tokens and at least one user definable token in the user input, wherein a user definable token is definable only by the user and is either a defined user definable token or an undefined user definable token, a defined user definable token having been previously fully defined by the user and an undefined user definable token having not been defined by the user;
    an output component configured to display each detected undefined user definable token to the user;
    a function variable tool programmed to receive a token definition from the user for each undefined user definable token and associate the token definition with the respective undefined user definable token, the association causing the undefined user definable token to become a new defined user definable token and the received token definition to be persistently associated with all instances of the new defined user definable token; and
    a processing component programmed to process the mathematical function to obtain a desired result once each token in the function is parsed.

7. The system of claim 6, wherein the input component comprises a first graphical user interface configured to accept the user's input and a second graphical user interface configured to receive the at least one token definition from the user.

8. The system of claim 6, wherein the detector comprises a token detection tool configured to monitor the user's input for an undefined user definable token.

9. The system of claim 6, wherein the output component comprises a first graphical user interface configured to display the user's input and a second graphical interface configured to display the detected user definable token.

10. The system of claim 9, wherein the detected user definable token comprises an undefined user definable token.

11. The system of claim 6, wherein the function variable tool comprises a user interface generator configured to generate a graphical user interface, wherein the graphical user interface is configured to facilitate the user to graphically associate the at least one token definition with the user definable token.

12. The system of claim 6, wherein the detected user definable token comprises an undefined user definable token.

13. A system including executable instructions on a computer readable storage medium for processing a mathematical function input by a user, comprising:
    means for receiving in put from the user defining a mathematical function including a set of terminal tokens and non-terminal tokens, wherein a non-terminal token is reducible to at least one terminal token;
    means for reducing the non-terminal tokens into terminal tokens, the tokens including predefined tokens and at least one user definable token, wherein a user definable token is definable only by the user and is either a defined user definable token or an undefined user definable token, a defined user definable token having been previously fully defined by the user and an undefined user definable token having not been defined by the user, included in the user input;

means for parsing the tokens to identify any syntax errors in the user input, wherein identification of a syntax error in the user input will cause a notification to be provided to the user;

means for displaying each undefined user definable token; and means for receiving a token definition from the user for each undefined user definable token and associating the received token definition with the respective undefined user definable token, the association causing the undefined user definable token to become a new defined user definable token and the received token definition to be persistently associated with all instances of the new defined user definable token, wherein each token in the function is parsed such that the mathematical function can be processed to obtain a desired result.

14. The system of 13, wherein the means for receiving a user's input comprises a means for generating a graphical user interface configured to receive and display the user's input and the token definition.

15. The system of 13, wherein the means for parsing the function comprises a token detection tool configured to detect any undefined user definable tokens included in the user's input.

16. The system of 13, wherein the means for outputting the detected user definable token comprises a function variable tool configured to generate a display of the detected user definable token and the token definition.

17. The system of 16, wherein the detected user definable token comprises an undefined user definable token.

18. The system of 13, wherein the means for associating the detected user definable token with the definition comprises a function variable tool configured to associate the received token definition with the detected user definable token.

19. The system of 13, wherein the detected user definable token comprises an undefined user definable token.

* * * * *

UNITED STATES PATENT AND TRADEMARK OFFICE
CERTIFICATE OF CORRECTION

PATENT NO. : 7,559,028 B2
APPLICATION NO. : 11/042958
DATED : July 7, 2009
INVENTOR(S) : David Yung It is certified that error appears in the above-identified patent and that said Letters Patent is hereby corrected as shown below:

In column 8, line 56, delete "divide" and insert -- divide- --, therefor.

In column 9, line 40, delete "function," and insert -- function --, therefor.

In column 11, line 64, delete "illustrated." and insert -- illustrated --, therefor.

In column 20, line 14, in claim 6, delete "in put" and insert -- input --, therefor.

In column 20, line 62, in claim 13, delete "in put" and insert -- input --, therefor.

In column 22, line 1, in claim 14, after "of" insert -- claim --.

In column 22, line 5, in claim 15, after "of" insert -- claim --.

In column 22, line 9, in claim 16, after "of" insert -- claim --.

In column 22, line 13, in claim 17, after "of" insert -- claim --.

In column 22, line 15, in claim 18, after "of" insert -- claim --.

In column 22, line 20, in claim 19, after "of" insert -- claim --.

Signed and Sealed this

Sixth Day of July, 2010

David J. Kappos
*Director of the United States Patent and Trademark Office*